Oct. 14, 1958 — R. C. MOSER — 2,855,719
FISH LURE
Filed May 28, 1956
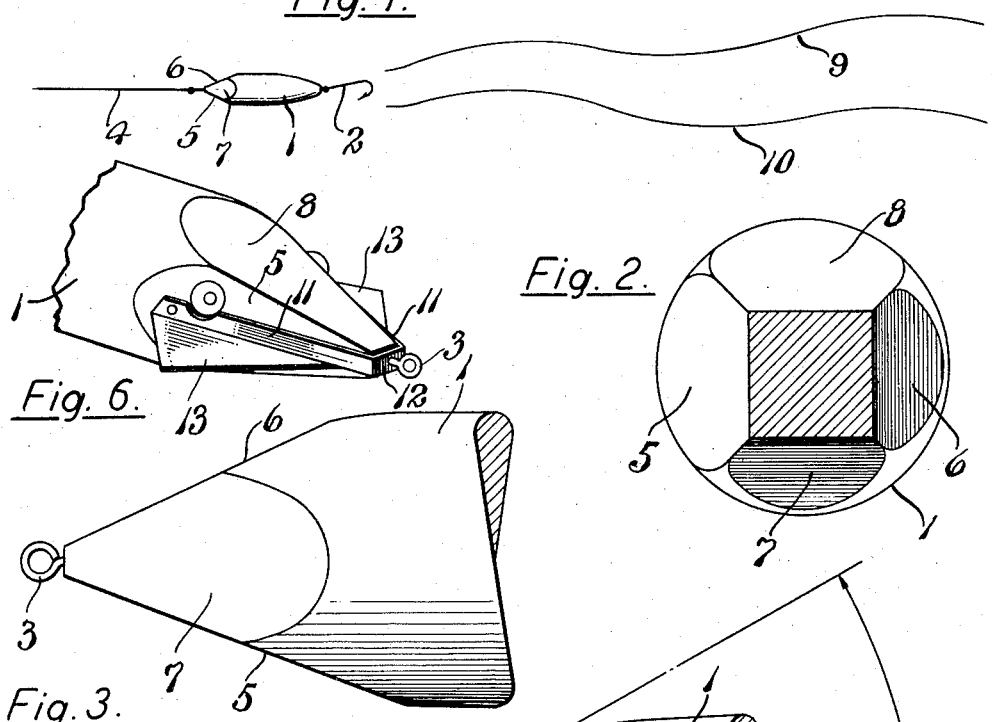
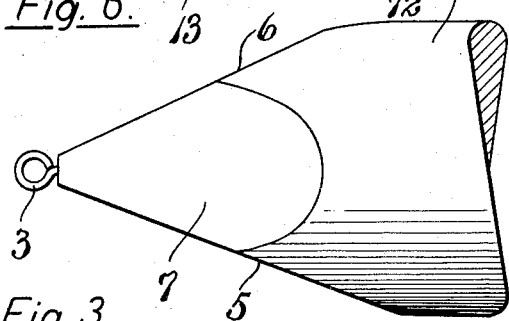
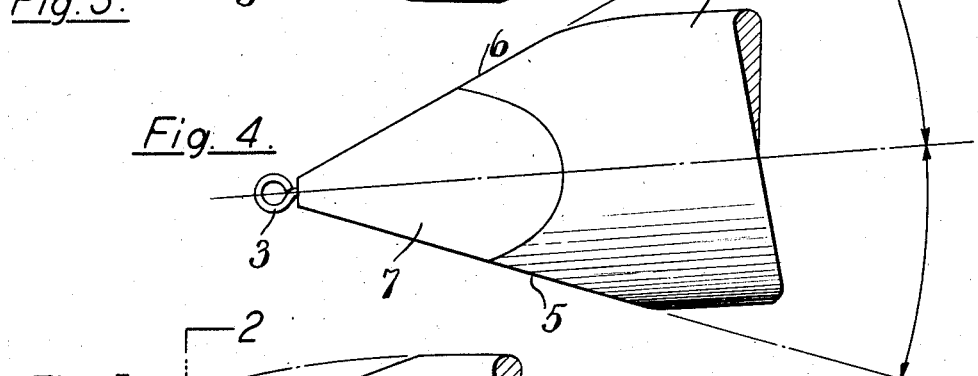
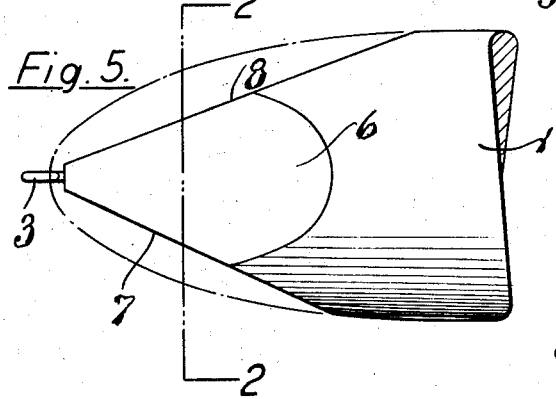
Inventor
Robert C. Moser
by Frank E. Liverance, Jr.
Attorney

United States Patent Office 2,855,719
Patented Oct. 14, 1958

2,855,719

FISH LURE

Robert C. Moser, Clearwater, Fla., assignor to Miracle Lure, Inc., Largo, Fla., a corporation of Florida Application May 28, 1956, Serial No. 587,659

1 Claim. (Cl. 43—42.48)

This invention relates to a simple, particularly useful and easily manufactured fish lure.

The fish lure which is attached at the rear end of a line and pulled through the water, has a generally cylindrical body, the front end portion of which in longitudinal section has an elliptical curved form, the surface portions radially outward from the longitudinal axis of the body being, at any vertical transverse plane, equally distant from such axis. When drawn through the water such fish lure moves substantially in a straight line.

With my invention, by a novel structure of the front end portion of the lure, to which the line is attached, forces are generated when the lure is drawn through water which, becoming greater at one side of the front portion of the lure than at the other side causes such lure to dart laterally or sideways, until balanced and overcome, due to the changing angle of the length of the lure to the length of the line that it will swing back and dart in the opposite direction, the travel of the lure through the water being in a continuous series of substantially reverse curves. Such movement through the water simulates much more clearly and accurately the movements of a live small fish and is, therefore, correspondingly attractive to the larger fish which feed on them.

Further, with my invention by like formation at the upper and lower sides of the front end portion of the lure where attached to the line, the movement of the lure may be a darting in a downward direction followed by an upward movement, repeated one after the other, so that there is a like departure from a straight line motion in a vertical plane as well as in a horizontal plane.

My invention is directed to a practical, simple and economical structure which attains the effects described in an exceptionally perfect manner.

An understanding of the invention may be had from the following description, taken in connection with the accompanying drawing, in which, Fig. 1 is a side elevation of a lure made in accordance with my invention and attached to a pulling line therefor, the paths of movement of the lure through the water in vertical and horizontal planes being diagrammatically shown to the rear thereof.

Fig. 2 is a transverse vertical section on the plane of line 2—2 of Fig. 5 looking to the rear.

Fig. 3 is an enlarged side elevation of the front end of the lure in one position it may occupy when attached to the line.

Fig. 4 is a similar elevation illustrating the angles of the side surfaces at the front end portion of the lure with respect to the longitudinal axis thereof.

Fig. 5 is an elevation with the lure turned about its axis through 90 degrees, and Fig. 6 is a fragmentary perspective view of the front end portion of the lure of my invention having stabilizing means connected therewith.

The body 1 of the lure made of any suitable well known material, at its intermediate portion may be circular in cross section tapering toward its rear end and having a hook 2 at its rear end, or hooks may be attached at other places thereto. At the front end in line with the longitudinal axis of the lure, an eye 3 is secured to which the rear ends of a pulling line 4 is connected.

With my invention at opposite upper and lower sides, surfaces 5 and 6 are cut as shown, the planes of which lie at an acute angle to the horizontal plane of the axis of the lure. One surface is of greater area than the other, for example, the surface 5 is greater than surface 6. Similarly, at opposite sides of the front portion of the lure other parts are cut away to provide the surfaces 7 and 8, that at 8 being substantially of the same area as that at 5, and that at 7 being substantially the same as that at 6. While the surface 5 is shown at the under side in Figs. 3 and 4, it is evident that by turning the body through 180 degrees such surface 5 may be at the upper side and surface 6 at the lower side. Or by turning the body through an arc of 90 degrees about its longitudinal axis the surface 8 may be changed from generally vertical to generally horizontal.

With the structure described, and with the surfaces as in Fig. 1, the component of the force coming against the surface 8 at right angles to the length of the axis of the body is greater than the corresponding component oppositely against the surface 7. This will cause (Fig. 5) a darting of the bait by a turning thereof at its front end portion away from the surface 8 which, because of the change of angular relation of the length of the line 4 to the longitudinal axis of the body of the lure, a reverse turning and darting in the opposite direction will shortly take place, one following the other in succession, the path of the bait being a successive series of reverse curves as indicated by the line 9 of Fig. 1.

Similarly when a larger surface such as 5 or 8 is at the upper side of the front end portion of the lure there will be forces developed which will cause the bait to dive for a short distance then curve upwardly, followed by a second diving motion the bait in a vertical plane following a path in accordance with the line 10 in Fig. 1.

Because of the similar areas of the surfaces 5 and 8 and 6 and 7 and the like angles which their planes occupy to the horizontal and vertical planes to the longitudinal axis of the lure, it is not of importance so far as lateral darting movement is concerned which surface, the larger surface 8 or the smaller surface 7 is at one side or the other. For the diving motion the larger surface 5 should be at the upper side. If at the lower side, as in Fig. 3, there will be a tendency for the bait to dart upwardly until it reaches the surface of the water and then move downwardly under its weight.

In Fig. 6 a stabilizing attachment is shown secured to the front end portion of the lure, the structure of the lure lending itself for the ready addition of the simple stabilizing means which is shown. Such stabilizing means comprises a flat bar bent into generally U-shape having legs 11 which diverge and lie against opposite sides 5 and 6 of the lure at its front. Such legs 11 at their front ends are integrally connected by a cross bar 12 through which the line securing eye 3 passes. From the lower edge of each of the legs 11 a flat generally horizontal wing or vane 13 extends outwardly. Said wings being in generally the same horizontal plane stabilize the lure against erratic undesired movements. Such stabilizing structure is simple and very economical to produce and easily secured in place by the line attaching eye 3, and by brads, small screws or the like passing through the legs 11 into the body of the lure.

The structure described is the best embodiment of my invention of which I am aware. It is evident, however, that the surfaces at 5 and 6 do not need to be each in a single plane but may be concave for example and may be varied in many ways so as to get the greater force components acting upon the bait at its front end portion either at one side or the other, and either at such upper or lower sides as choice may dictate.

The invention is not limited to the structure illustrated but is to be considered comprehensive of all forms of structure coming within the scope of the claim defining the invention.

I claim:

A fish lure comprising: an elongated body; the front portion of said body having four forwardly convering surfaces each disposed in a plane at an acute angle to the longitudinal axis of said body; said surfaces being arranged in pairs, one surface of each pair being at a different angle to said axis and having a greater area than the other; attachment means for a line at the apex between said surfaces whereby unequal forces are exerted against said surfaces when said lure is moved forwardly by a force exerted through said attachment means.

References Cited in the file of this patent

UNITED STATES PATENTS

| | | |
|---|---|---|
| 1,114,137 | Heddon | Oct. 20, 1914 |
| 1,200,135 | Reynolds | Oct. 3, 1916 |
| 1,499,689 | Pflueger et al. | July 1, 1924 |